United States Patent
Walther et al.

(10) Patent No.: US 11,130,834 B2
(45) Date of Patent: Sep. 28, 2021

(54) POLYAMIDE FOAMS WHICH INHIBIT THE SPREAD OF FIRES FOR FILLING CAVITIES IN MINING

(71) Applicant: Construction Research & Technology GmbH, Trostberg (DE)

(72) Inventors: Burkhard Walther, Oldenburg (DE); Bernhard Feichtenschlager, Trostberg (DE); Christoph Herrmann, Trostberg (DE)

(73) Assignee: Construction Research & Technology GmbH

( * ) Notice: Subject to any disclaimer, the term of this patent is extended or adjusted under 35 U.S.C. 154(b) by 238 days.

(21) Appl. No.: 16/326,869

(22) PCT Filed: Sep. 4, 2017

(86) PCT No.: PCT/EP2017/072096
§ 371 (c)(1),
(2) Date: Feb. 20, 2019

(87) PCT Pub. No.: WO2018/046437
PCT Pub. Date: Mar. 15, 2018

(65) Prior Publication Data
US 2019/0211137 A1 Jul. 11, 2019

(30) Foreign Application Priority Data
Sep. 6, 2016 (EP) .................................. 16187417

(51) Int. Cl.
| | | |
|---|---|---|
| C09K 8/588 | (2006.01) | |
| C08G 18/76 | (2006.01) | |
| C08G 18/34 | (2006.01) | |
| C08K 5/521 | (2006.01) | |
| C08K 5/16 | (2006.01) | |
| E04B 1/82 | (2006.01) | |
| E04B 1/94 | (2006.01) | |
| E21B 33/138 | (2006.01) | |
| E21F 15/00 | (2006.01) | |
| C08G 101/00 | (2006.01) | |

(52) U.S. Cl.
CPC ....... *C08G 18/7664* (2013.01); *C08G 18/341* (2013.01); *C08G 18/345* (2013.01); *C08K 5/16* (2013.01); *C08K 5/521* (2013.01); *C09K 8/588* (2013.01); *E04B 1/82* (2013.01); *E04B 1/948* (2013.01); *E21B 33/138* (2013.01); *E21F 15/005* (2013.01); *C08G 2101/00* (2013.01); *C08G 2110/005* (2021.01); *C08G 2110/0058* (2021.01); *C08G 2350/00* (2013.01)

(58) Field of Classification Search
CPC ....................... C08G 18/7664; C08G 18/341; C08G 18/345; C08G 2101/005; C08G 2101/0058; C08G 2101/00; C08G 2350/00; C08K 5/521; C08K 5/16; C09K 8/588; E04B 1/82; E04B 1/948; E21F 15/005
See application file for complete search history.

(56) References Cited

U.S. PATENT DOCUMENTS

| | | | |
|---|---|---|---|
| 5,527,876 A * | 6/1996 | Kluth ...................... | C08G 18/18 521/90 |
| 2013/0225708 A1* | 8/2013 | Prissok .................. | C08G 18/14 521/154 |

FOREIGN PATENT DOCUMENTS

| | | |
|---|---|---|
| DE | 2150151 | 4/1972 |
| GB | 1319916 | 6/1973 |
| WO | 93/15121 | 8/1993 |
| WO | 2016/127016 A1 | 8/2016 |

OTHER PUBLICATIONS http://www.jshihua.com/wap_product_detail_en/id/17.html downloaded on Mar. 26, 2021.*
International Search Report for PCT/EP2017/072096 dated Nov. 28, 2017.
Written Opinion for PCT/EP2017/072096 dated Nov. 28, 2017.

* cited by examiner

*Primary Examiner* — Kumar R Bhushan
(74) *Attorney, Agent, or Firm* — Curatolo Sidoti Co., LPA; Salvatore A. Sidoti; Floyd Trillis, III

(57) ABSTRACT

Polyamide foams which do not propagate fire are obtained by mixing (i) a liquid isocyanate component which comprises at least one polyisocyanate and in which the molar ratio of aromatic isocyanate groups to the sum of aromatic and aliphatic isocyanate groups is at least 60 mol %, with (ii) at least one liquid isocyanatereactive component which comprises a reactive diluent, and the reactive diluent 10 comprises (a) a chain-extending and/or crosslinking reactive diluent selected from among aliphatic branched $C_{24\text{-}66}$-polycarboxylic acids, alicyclic $C_{24\text{-}66}$-polycarboxylic acids and partial esters of polycarboxylic acids having at least two unesterified carboxyl groups and/or (b) a chain-terminating reactive diluent selected from among aliphatic branched $C_{24\text{-}66}$-monocarboxylic acids, alicyclic $C_{24\text{-}66}$-monocarboxylic acids and partial esters of polycarboxylic acids having one unesterified carboxyl group, wherein the liquid isocyanate-reactive component comprises an aromatic $C_{8\text{-}18}$-polycarboxylic acid and/or an anhydride thereof.

10 Claims, 2 Drawing Sheets

POLYAMIDE FOAMS WHICH INHIBIT THE SPREAD OF FIRES FOR FILLING CAVITIES IN MINING

CROSS REFERENCE TO RELATED APPLICATIONS

Figure 1:
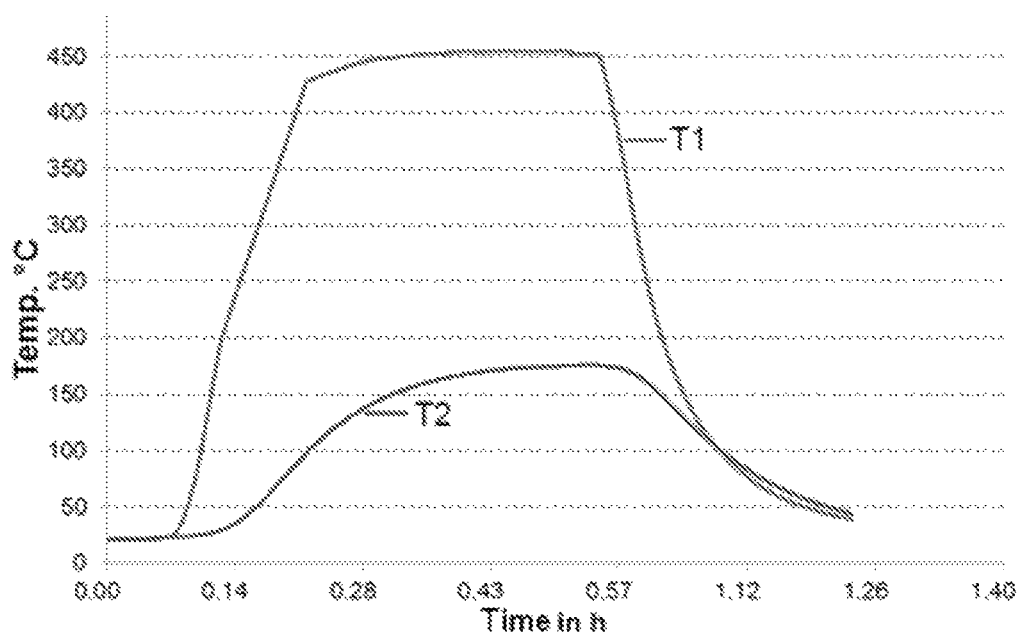

This application is a national stage application of International Application No. PCT/EP2017/072096, filed 4 Sep. 2017, which claims priority from European Patent Application No. 16187417.7, filed 6 Sep. 2016, which applications are incorporated herein by reference.

The present invention relates to a process for producing polyamide foams which do not propagate fire and also a process for filling cavities in mining, tunnel construction, civil engineering or in oil and gas recovery.

For safety reasons, cavities occurring in civil engineering and mining, e.g. tunnel construction, mine gallery construction or demolishing, have to be filled in order to prevent detachment of rock or caving-in. In general, this is achieved by means of self-foaming, curable compositions. The curable form is produced by mixing two components which are subsequently introduced into the cavity where they form a foam and cure in a chemical reaction under the ambient conditions. One example is polyurethanes or polyurea silicates.

However, in coal mining only cavity fillers which do not propagate a fire may be used. The fire propagation behavior can be determined by the punking test (BS 5946:1980). In this test, a piece of foam is heated locally by means of a Bunsen burner and it is determined whether the fire front propagates after removal of the flame. Many of the classical cavity fillers do not meet this requirement. Known examples of cavity fillers which do not propagate fire are foams based on phenol-formaldehyde resin. However, the phenol content of preparations is regulated by law. For reasons of occupational hygiene, it is therefore desirable to have phenol-free alternatives.

DE 2 150 151 A1 discloses foams which are composed of aromatic polyamides and are nonflammable or self-extinguishing. They are produced by reacting an aromatic diisocyanate with at least one bifunctional aromatic compound having an acid function in bulk in the molten state. However, temperatures of from 180 to 320° C. are required in order to melt the aromatic dicarboxylic acids. This circumstance makes the use of the foams described in mining impossible; here, a process in which two components which are liquid at ambient temperatures are mixed in order to produce the foam is desirable. Experiments on dissolving or dispersing the solid aromatic dicarboxylic acids in diluents or solvents and using them in this form led to a deterioration in the mechanical properties of the foams.

WO 2016/127016 discloses compositions for forming heat-resistant foams, which comprise an organic polyisocyanate, a polycarboxylic acid, a polyol, a surfactant and a catalyst. As suitable polycarboxylic acid, mention is made of, inter alia, dimeric and trimeric fatty acids.

WO 93/15121 describes a process for producing thermoplastic or thermoset polymers having amide groups by catalytic reaction of polyfunctional isocyanates with carboxylic acids and optionally alcohols or polyfunctional amines with formation of $CO_2$.

It is an object of the present invention to provide a process for producing aromatic polyamide foams which do not propagate fire, which process employs two components which are liquid at ambient temperatures and gives foams having a suitable mechanical strength.

The object is achieved by a process for producing polyamide foams which do not propagate fire by mixing
(i) a liquid isocyanate component which comprises at least one polyisocyanate and in which the molar ratio of aromatic isocyanate groups to the sum of aromatic and aliphatic isocyanate groups is at least 60 mol % with
(ii) at least one liquid isocyanate-reactive component which comprises a reactive diluent, where the reactive diluent comprises
  (a) a chain-extending and/or crosslinking reactive diluent selected from among aliphatic branched $C_{24-66}$-polycarboxylic acids, alicyclic $C_{24-66}$-polycarboxylic acids and partial esters of polycarboxylic acids having at least two unesterified carboxyl groups and/or
  (b) a chain-terminating reactive diluent selected from among aliphatic branched $C_{24-66}$-monocarboxylic acids, alicyclic $C_{24-66}$-monocarboxylic acids and partial esters of polycarboxylic acids having one unesterified carboxyl group, and
(iii) optionally a solid isocyanate-reactive component,
where the liquid isocyanate-reactive component and/or the solid isocyanate-reactive component comprises an aromatic $C_{8-18}$-polycarboxylic acid and/or an anhydride thereof.

For the present purposes, a polycarboxylic acid is a carboxylic acid which has at least two carboxyl groups, e.g. a dicarboxylic acid, tricarboxylic acid and/or tetracarboxylic acid. For the present purposes, a liquid component is a material or mixture which under ambient conditions (25° C., 1 bar) is present in liquid, pumpable form. This comprises, for example, solutions or suspensions, preferably solutions.

Carboxyl groups evolve carbon dioxide in the reaction with isocyanates; the carbon dioxide that forms acts as blowing agent for foam formation. An amide bond is formed from the carboxyl group and the isocyanate group. According to the invention, concomitant use is made of particular reactive diluents which allow simplified handling of the otherwise solid polycarboxylic acids and allow a reaction under comparatively mild conditions. The reactive diluents participate in the polyaddition reaction; they therefore do not vaporize from the finished foam and do not significantly impair the mechanical properties thereof.

In the present process for producing polyamide foams which do not propagate fire a liquid isocyanate component which comprises a polyisocyanate and a liquid isocyanate-reactive component which comprises a reactive diluent are mixed with one another. Optionally, an additional solid isocyanate-reactive component can be added or be predispersed in the liquid isocyanate-reactive component. The reactive diluent used according to the invention can have a chain-extending and/or crosslinking action when it has at least two carboxyl groups, or a chain-terminating action when it has one carboxyl group. The liquid and/or solid isocyanate-reactive component comprise(s) at least one aromatic $C_{8-18}$-polycarboxylic acid and/or an anhydride thereof.

The components are preferably mixed in such amounts that there are from 0.2 to 2 equivalents of carboxylic acid groups, calculated as the sum of the carboxylic acid and/or anhydride groups in the liquid isocyanate-reactive component and the solid isocyanate-reactive component, per one equivalent of NCO groups of the isocyanate component.

Mixing is carried out in a suitable manner at a temperature of from 0 to 80° C., in particular from 10 to 60° C. In general, the components have to be preheated or temperature-controlled only slightly or not at all, which greatly assists performance of the process of the invention. Foaming commences spontaneously and the initially liquid viscous foam hardens by itself. The reaction is slightly exothermic. Mixing can be carried out by mixing by means of a stirrer. However, the components are preferably pumped separately into a mixing apparatus and homogenized there, e.g. in a static mixer.

The liquid isocyanate component comprises aromatic polyisocyanates and can comprise aliphatic polyisocyanates, including cycloaliphatic polyisocyanates, with the proviso that the molar ratio of aromatic isocyanate groups to the sum of aromatic and aliphatic isocyanate groups is at least 60 mol %, preferably at least 80 mol %, in particular at least 90 mol % and particularly preferably at least 95 mol %. In particular embodiments, the liquid isocyanate component comprises virtually exclusively polyisocyanates having exclusively aromatic isocyanate groups. For the purposes of the present invention, aromatic isocyanate groups are isocyanate groups which are bound directly to an aromatic ring. Aliphatic isocyanate groups are considered to be isocyanate groups which are bound to a nonaromatic carbon atom. For example, the isocyanate groups in m-xylylene diisocyanate are for this reason considered to be aliphatic isocyanate groups even though the molecule comprises an aromatic benzene ring since they are bound only indirectly via methylene groups to the benzene ring. It is presumed that the molar ratio of aromatic isocyanate groups to the sum of aromatic and aliphatic isocyanate groups in the range indicated is responsible for the non-fire-propagating property of the foams obtained.

The isocyanate component preferably has an NCO functionality of at least 1.8, preferably from 1.8 to 5 and more preferably from 2.1 to 4. The polyisocyanates which can be used preferably have a content of isocyanate groups (calculated as NCO, molecular weight=42) of from 10 to 60% by weight based on the polyisocyanate (mixture), preferably from 15 to 60% by weight and particularly preferably from 20 to 55% by weight.

Examples of aromatic polyisocyanates are diphenyl methane 2,2'-, 2,4'- and 4,4'-diisocyanate (MDI) and isomer mixtures thereof, mixtures of monomeric diphenyl methane diisocyanates and homologs of diphenyl methane diisocyanate having more than two rings (polymeric MDI), tolylene 2,4- or 2,6-diisocyanate (TDI) and isomer mixtures thereof, phenylene 1,3- or 1,4-diisocyanate, 1-chlorophenylene 2,4-diisocyanate, naphthylene 1,5-diisocyanate (NDI), biphenylene 4,4'-diisocyanate, 4,4'-diisocyanato-3,3'-dimethylbiphenyl, 3-methyldiphenyl methane 4,4'-diisocyanate, tetramethylxylylene diisocyanate, 1,4-diisocyanatobenzene or diphenyl ether 4,4'-diisocyanate.

Aliphatic diisocyanates which can be concomitantly used to a limited extent are tetramethylene diisocyanate, hexamethylene diisocyanate (1,6-diisocyanatohexane), octamethylene diisocyanate, decamethylene diisocyanate, dodecamethylene diisocyanate, tetradecamethylene diisocyanate, derivatives of lysine diisocyanate, m- or p-xylylene diisocyanate, tetramethylxylylene diisocyanate, trimethylhexane diisocyanate or tetramethylhexane diisocyanate, cycloaliphatic diisocyanates such as 1,4-, 1,3- or 1,2-diisocyanatocyclohexane, 4,4'- or 2,4'-di(isocyanatocyclohexyl)methane, 1-isocyanato-3,3,5-trimethyl-5-(iso-cyanatomethyl)cyclohexane (isophorone diisocyanate), 1,3- or 1,4-bis(isocyanatomethyl)cyclohexane or 2,4-, or 2,6-diisocyanato-1-methyl-cyclohexane and also 3 (or 4), 8 (or 9)-bis(isocyanatomethyl)tri-cyclo[$5.2.1.0^{2.6}$]decane isomer mixtures.

Further possible polyisocyanates are polyisocyanates having isocyanurate groups, uretdione diisocyanates, polyisocyanates having biuret groups, polyisocyanates having urethane or allophanate groups, polyisocyanates comprising oxadiazinetrione groups, uretonimine-modified polyisocyanates of linear or branched $C_4$-$C_{20}$-alkylene diisocyanates, cycloaliphatic diisocyanates.

Further suitable polyisocyanates are
1. Polyisocyanates which have isocyanurate groups and are derived from aromatic, aliphatic and/or cycloaliphatic diisocyanates. The isocyanurates present here are, in particular, cyclic trimers of the diisocyanates or mixtures with their higher homologs having more than one isocyanurate ring.
2. Uretdione diisocyanates having aromatically, aliphatically and/or cycloaliphatically bound isocyanate groups. Uretdione diisocyanates are cyclic dimerization products of diisocyanates.
3. Polyisocyanates which have biuret groups and have aromatically, aliphatically or cycloaliphatically bound isocyanate groups.
4. Polyisocyanates which have urethane and/or allophanate groups and have aromatically, aliphatically or cycloaliphatically bound isocyanate groups, as can be obtained, for example, by reaction of excess amounts of diisocyanate with polyhydric alcohols such as trimethylolpropane, neopentyl glycol, pentaerythritol, 1,4-butanediol, 1,6-hexanediol, 1,3-propanediol, ethylene glycol, diethylene glycol, glycerol, 1,2-dihydroxypropane or mixtures thereof.
5. Polyisocyanates comprising oxadiazinetrione groups.
6. Uretonimine-modified polyisocyanates.

Polyisocyanates can also be used in the form of polyisocyanate prepolymers. These polyisocyanate prepolymers are obtainable by reacting above-described polyisocyanates in excess with polyols, for example at temperatures of from 30 to 100° C., preferably at about 80° C., to give the prepolymer.

Preference is given to using monomeric diphenylmethane diisocyanate, for example diphenylmethane 2,2'-diisocyanate, diphenylmethane 2,4'-diisocyanate, diphenylmethane 4,4'-diisocyanate or isomer mixtures thereof as polyisocyanates. The diphenylmethane diisocyanate can also be used as a mixture with its derivatives. In this case, diphenylmethane diisocyanate can particularly preferably comprise up to 10% by weight, more particularly preferably up to 5% by weight, of carbodiimide-, uretdione-, allophanate- or uretonimine-modified diphenylmethane diisocyanate, in particular carbodiimide-modified diphenylmethane diisocyanate.

The liquid isocyanate-reactive component comprises a reactive diluent. The reactive diluent is selected from among a (a) chain-extending and/or crosslinking reactive diluent and (b) chain-terminating reactive diluent or mixtures thereof. Embodiments which use at least one chain-extending and/or crosslinking reactive diluent are preferred. Chain-extending and/or crosslinking reactive diluents comprise aliphatic branched $C_{24-66}$-polycarboxylic acids, alicyclic $C_{24-66}$-polycarboxylic acids and partial esters of polycarboxylic acids having at least two unesterified carboxyl groups. Branched $C_{24-66}$-polycarboxylic acids preferably have at least one branch which goes out from the longest linear carbon chain and comprises at least four carbon atoms. The branched $C_{24-66}$-polycarboxylic acids and/or alicyclic $C_{24-66}$-polycarboxylic acids are preferably selected from among dimeric fatty acids, trimeric fatty acids and mixtures thereof, which are optionally hydrogenated.

The oligomerization of unsaturated fatty acids is a known electrocyclic reaction which is the subject of reports in review articles, for example by A. Behr in Fat Sei. Technol. 93, 340 (1991), G. Spiteller in Fat Sei. Technol. 94, 41

(1992) or P. Daute et al. in Fat Sei. Technol. 95, 91 (1993). In the oligomerization, an average of from 2 to 3 fatty acids combine and form dimers or trimers which predominantly have branched and/or cycloaliphatic structures. Apart from the fraction of the dimers and trimers, a monomer fraction in which unreacted starting materials and branched monomers which have been formed by isomerization during the course of the reaction are present. In addition, there is of course also a fraction of higher oligomers, but this is generally not of any great importance. The oligomerization can be carried out thermally or in the presence of noble metal catalysts. The reaction is preferably carried out in the presence of clay minerals such as montmorillonite, cf. Fette, Seifen, Anstrichmitt. 72, 667 (1970). Regulation of the content of dimers and trimers or the extent of the monomer fraction can be controlled by means of the reaction conditions. Industrial mixtures can finally also be purified by distillation.

Possible starting materials for the oligomerization are industrial unsaturated fatty acids having from 12 to 22, preferably from 16 to 18, carbon atoms. Typical examples are palmitoleic acid, oleic acid, elaidic acid, petroselinic acid, linoleic acid, linolenic acid, conjugated fatty acid, eleostearic acid, ricinoleic acid, gadoleic acid, erucic acid and also industrial mixtures thereof with saturated fatty acids. Typical examples of suitable industrial mixtures are unhardened acids from the cracking of natural triglycerides having iodine numbers in the range from 40 to 140, for instance palm oil fatty acid, tallow fatty acid, rapeseed oil fatty acid, sunflower oil fatty acid and the like. Preference is given to fatty acids from the cracking of fats having a high content of oleic acid. Apart from the fatty acids, the esters thereof, preferably methyl esters, can also be dimerized. It is likewise possible to oligomerize the acid and convert it into the methyl ester before hydrogenation. The conversion of the ester group into the acid group is carried out in a manner known per se.

Dimeric fatty acids which are particularly preferred for the purposes of the invention are obtained by oligomerization of technical-grade oleic acid and preferably have a dimer content of from 50 to 99% by weight and a trimer content of from 1 to 50% by weight. The content of monomers can be from 0 to 15% by weight and can if necessary be reduced by distillation. The % by weight are based on the total amount of fatty acid oligomer.

Suitable fatty acid dimers have the formula HOOC-Dim-COOH, where Dim is one of the following radicals:

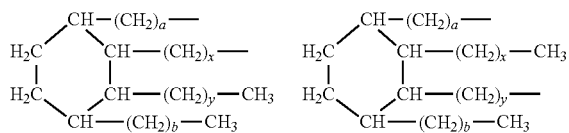

where a+b=12 and x+y=14

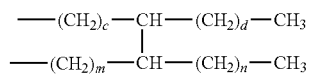

where c+d=19 and m+n=14.

As an alternative or in addition, partial esters of polycarboxylic acids can be used as reactive diluents. Suitable chain-extending and/or crosslinking reactive diluents are, for example, monoesters of trimellitic acid, monoesters or diesters of tetracarboxybenzene, etc. Suitable alcohol components of the partial esters comprise n-butanol, isobutanol, n-hexanol, n-heptanol, 2-ethylhexanol, n-octanol, isononanol, cis-9-octadecanol, benzyl alcohol, etc.

Chain-terminating reactive diluents comprise aliphatic branched $C_{24-66}$-mono-carboxylic acids and alicyclic $C_{24-66}$-monocarboxylic acids. Aliphatic branched monocarboxylic acids can be prepared by oxidation of oxo-aldehydes which are in turn obtainable by hydroformylation of olefin oligomers.

Further chain-terminating reactive diluents comprise partial esters of polycarboxylic acids having an unesterified carboxyl function. Suitable acid components of the partial esters comprise phthalic acid, terephthalic acid, isophthalic acid, trimellitic acid, tetracarboxybenzene, naphthalenedicarboxylic acid, adipic acid, sebacic acid, cyclohexanedicarboxylic acid, etc. Preference is given to using partial esters of aromatic polycarboxylic acids. It is possible to use phthalic monoesters, terephthalic monoesters, diesters of trimellitic acid, triesters of tetracarboxybenzene, naphthalenedicarboxylic monoesters, adipic monoesters, sebacic monoesters, cyclohexanedicarboxylic monoesters, etc., as chain-terminating reactive diluents. Suitable alcohol components of the partial esters comprise n-butanol, isobutanol, n-hexanol, n-heptanol, 2-ethylhexanol, n-octanol, isononanol, cis-9-octadecenol, benzyl alcohol, etc.

The liquid isocyanate-reactive component and/or the solid isocyanate-reactive component comprise an aromatic $C_{8-18}$-polycarboxylic acid and/or an anhydride thereof. The aromatic $C_{8-18}$-polycarboxylic acid serves as crosslinker and as carbon dioxide generator. The concomitant use of an aromatic polycarboxylic acid contributes to the non-fire-propagating property of the foams obtained. In addition, the liquid and/or solid isocyanate-reactive component can to a limited extent comprise a nonaromatic $C_{4-18}$-polycarboxylic acid.

The molar ratio of aromatic carboxyl groups to the sum of aromatic and aliphatic carboxyl groups in the liquid isocyanate-reactive component and, if used, the solid isocyanate-reactive component is preferably at least 10 mol %, in particular at least 15 mol %. Aromatic carboxyl groups are considered to be carboxyl groups which are bound directly to an aromatic ring. Aliphatic carboxyl groups are considered to be carboxyl groups which are bound to a nonaromatic carbon atom. The reactive diluents (aliphatic branched $C_{24-66}$-polycarboxylic acids, alicyclic $C_{24-66}$-poly-carboxylic acids, aliphatic branched $C_{24-66}$-monocarboxylic acids, alicyclic $C_{24-66}$-monocarboxylic acids and partial esters of nonaromatic polycarboxylic acids) and any nonaromatic $C_{4-18}$-polycarboxylic acids concomitantly used contribute to the aliphatic carboxyl groups. The contribution of the reactive diluents to the aliphatic carboxyl groups can advantageously be calculated as W/E, where W is the weight of reactive diluent (in g) and E is the equivalent weight (in g/mol). The equivalent weight E can in turn be calculated from the acid number AN (in mg KOH/g) as E=56.11/AN, where 56.11 is the molecular weight of KOH. The acid number AN is usually specified by the manufacturers of dimeric fatty acids or trimeric fatty acids.

In useful embodiments, the weight ratio of aromatic $C_{8-18}$-polycarboxylic acid and/or anhydride thereof to the chain-extending and/or crosslinking reactive diluent and/or chain-terminating reactive diluent is from 1:20 to 20:1, preferably from 1:10 to 10:1.

Suitable aromatic polycarboxylic acids are aromatic $C_{8-18}$-polycarboxylic acids such as phthalic acid, terephthalic acid, isophthalic acid, aminoisophthalic acid, trimellitic acid, tetracarboxybenzene, naphthalenedicarboxylic acid, bisphenyldicarboxylic acid, etc., and also the anhydrides thereof.

Suitable nonaromatic polycarboxylic acids are aliphatic polycarboxylic acids such as succinic acid, adipic acid, glutaric acid, pimelic acid, suberic acid, azelaic acid, sebacic acid, cyclohexyldicarboxylic acids, tetrahydrophthalic acids, citric acid, tartaric acid and anhydrides thereof.

The liquid isocyanate-reactive component and/or the solid isocyanate-reactive component optionally comprises a neutralizing agent for neutralizing the polycarboxylic acid. Preferred neutralizing agents are amines, in particular tertiary amines. Examples of suitable amines are triethylamine, tri(n-propyl)amine, N-methyl-N,N-di(n-butyl)amine, N-methylpiperidine, N-methylmorpholine, permethylated diethylenetriamine, triethylenediamine (1,4-diazabicyclo[2.2.2]octane, DABCO), triethanolamine, N,N-dimethylbenzylamine.

The liquid isocyanate-reactive component optionally comprises compounds which have at least two groups which are reactive toward isocyanate, for example —OH, —SH, —$NH_2$ or —$NHR^2$, where $R^2$ therein can independently be hydrogen, methyl, ethyl, isopropyl, n-propyl, n-butyl, isobutyl, sec-butyl or tert-butyl.

These are preferably diols or polyols such as hydrocarbon diols having from 2 to 20 carbon atoms, e.g. ethylene glycol, 1,2-propanediol, 1,3-propanediol, 1,1-dimethylethane-1,2-diol, 1,6-hexanediol, 1,10-decanediol, bis(4-hydroxycyclohexane)isopropylidene, tetramethylcyclobutanediol, 1,2-, 1,3- or 1,4-cyclohexanediol, cyclooctanediol, norbornanediol, pinanediol, decalindiol, etc., esters thereof with short-chain dicarboxylic acids such as adipic acid, cyclohexanedicarboxylic acid, or aliphatic diamines such as methylenebis(cyclohexylamine) and isopropylidenebis(cyclohexylamine), piperazine, 1,2-, 1,3- or 1,4-diaminocyclohexane, 1,2-, 1,3- or 1,4-cyclohexanebis(methylamine), etc., dithiols or polyfunctional alcohols, secondary or primary amino alcohols such as ethanolamine, diethanolamine, monopropanolamine, dipropanolamine etc., or thioalcohols such as thioethylene glycol.

Furthermore, diethylene glycol, triethylene glycol, dipropylene glycol, tripropylene glycol, neopentyl glycol, pentaerythritol, 1,2- and 1,4-butanediol, 1,5-pentanediol, 2-methyl-1,5-pentanediol, 2-ethyl-1,4-butanediol, 1,2-, 1,3- and 1,4-dimethylolcyclohexane, 2,2-bis(4-hydroxycyclohexyl)propane, glycerol, trimethylolethane, trimethylolpropane, trimethylolbutane, dipentaerythritol, erythritol and sorbitol, 2-aminoethanol, 3-amino-1-propanol, 1-amino-2-propanol or 2-(2-aminoethoxy)ethanol, bisphenol A, or butanetriol are also conceivable.

Furthermore, polyetherols or polyesterols or polyacrylate polyols having an average OH functionality of from 2 to 10 are also suitable, as are polyamines such as polyethyleneimine or polymers of, for example, poly-N-vinylformamide comprising free amine groups.

The liquid isocyanate-reactive component optionally comprises small amounts of water. The amount of water added is preferably not more than from 0.01 to 0.2 equivalents, based on the NCO content of the isocyanate component. The addition of water serves to introduce an additional blowing reaction and/or to modify the materials properties by means of a proportion of polyurea.

In general, mixing of the components is carried out in the presence of a polyaddition catalyst. The polyaddition catalyst allows the decarboxylation and polyamide formation to proceed under mild conditions. The liquid isocyanate component, the liquid isocyanate-reactive component and/or, if used, the solid isocyanate-reactive component preferably comprises a polyaddition catalyst.

As polyaddition catalysts, it is possible to use catalysts which are customarily employed in polyurethane chemistry. These are compounds which accelerate the reaction of the reactive hydrogen atoms, in particular of the polycarboxylic acids, with the organic polyisocyanates. Both Lewis bases and Lewis acids are effective catalysts. The most important Lewis bases are tertiary amines having various structures. The most important catalytic reactive Lewis acids are organic metal compounds.

The proportion of the polyaddition catalyst, based on the total weight of the components, is preferably from 0.01 to 2% by weight, particularly preferably from 0.02 to 1% by weight and in particular from 0.05 to 0.5% by weight. In a preferred embodiment of the present invention, no further catalysts apart from a Lewis base are used.

Possible polyaddition catalysts are organic metal compounds, preferably organic titanium compounds such as tetra(2-ethylhexyl) titanate, or organic tin compounds such as tin(II) salts of organic carboxylic acids, for example tin(II) acetate, tin(II) octoate, tin(II) ethylhexanoate, tin(II) laurate, and the dialkyltin(IV) salts of organic carboxylic acids, for example dibutyltin diacetate, dibutyltin dilaurate, dibutyltin maleate, dioctyltin diacetate, and also other metal-based catalysts such as carboxylates of the alkaline earth metals, e.g. magnesium stearate, and also aluminum salts, borates, etc., as described in a review by C. Gurtler, K. Danielmeier, Tetrahedron Letters 45 (2004) 2515-2521.

Further possibilities are tertiary amines such as triethylamine, tributylamine, N,N-dimethylcyclohexylamine, N,N-dimethylbenzylamine, N-methylmorpholine, N-ethylmorpholine, N-cyclohexylmorpholine, N,N,N',N'-tetramethylethylenediamine, N,N,N',N'-tetramethylbutylenediamine, N,N,N',N'-tetramethyl-1,6-hexylenediamine, pentamethyldiethylenetriamine, bis(dimethylaminoethyl) ether, bis(dimethylaminopropyl)urea, dimethylpiperazine, N-methylimidazole, 1,2-dimethylimidazole, 1-azabicyclo[3.3.0]octane, 1,4-diazabicyclo[2.2.2]octane (DABCO), and alkanolamine compounds such as triethanolamine, trisisopropanolamine, N-methyldiethanolamine and N-ethyldiethanolamine and dimethylethanolamine.

Further possible catalysts are: tris(dialkylamino)-s-hexahydrotriazines, in particular tris(N,N-dimethylamino)-s-hexahydrotriazine. Further possibilities are tetraalkylammonium salts such as N,N,N-trimethyl-N-(2-hydroxypropyl) formate, N,N,N-trimethyl-N-(2-hydroxypropyl) 2-ethylhexanoate, tetraalkylammonium hydroxides such as tetramethylammonium hydroxide, alkali metal hydroxides such as sodium hydroxide, alkali metal alkoxides such as sodium methoxide and potassium isopropoxide, and also alkali metal or alkaline earth metal salts of fatty acids having from 1 to 20 carbon atoms and optionally lateral OH groups.

It is also possible to use catalysts which are reactive toward isocyanates. They comprise a primary or secondary amino group or a hydroxyl group in addition to at least one tertiary amino group. Such catalysts include, for example, N,N-dimethyl-aminopropylamine, bis(dimethylaminopropyl)amine, N,N-dimethylaminopropyl-N'-methylethanolamine, dimethylaminoethoxyethanol, bis(dimethylamino-propyl)amino-2-propanol, N,N-dimethylaminopropyldipropanolamine, N,N,N'-trimethyl-N'-hydroxyethyl[(bisaminoethyl) ether], N,N-dimethylaminopropylurea, N-(2-hydroxypropyl)imidazole, N-(2-hydroxyethyl)imidazole, N-(2-amino-propyl)imidazole and/or the reaction products of ethyl acetoacetate, polyether polyols and 1-(dimethylamino)-3-aminopropane as described in EP-A 0 629 607.

Bis(alkylamino)alkyl ethers such as bis(2-dimethylaminoethyl) ether or 2,2'-dimorpholino(diethylether) and 2-(2-dialkylaminoalkoxy)alkanols, 2-(2-dimethylaminoethoxy) ethanol, are preferred because they not only catalyze the polyaddition reaction but are also strong blowing catalysts. In addition, 1,8-diazabicyclo[5.4.0]undec-7-ene and DABCO are preferred.

The liquid isocyanate component and/or the liquid isocyanate-reactive component, in particular the liquid isocyanate-reactive component, preferably comprises a foam stabilizer. Foam stabilizers are usually employed in amounts of from 0.01 to 5% by weight, based on the total weight of the components. Surface-active substances are suitable as foam stabilizers. Modified polysiloxanes such as trisiloxane surfactants, polyether siloxane or polysiloxane-polyoxyalkylene block polymers have been found to be particularly useful. Such compounds are obtainable from Evonik under the tradename Tegostab®. As stabilizers which are not based on silicone, it is possible to use copolymers based on ethylene oxide and butylene oxide, copolymers prepared from N-vinylpyrrolidone and maleic esters or oligomeric polyacrylates having polyoxyalkylene and fluoroalkane radicals as side groups.

The liquid isocyanate component and/or the liquid isocyanate-reactive component, in particular the liquid isocyanate-reactive component, optionally comprises a solvent to achieve sufficient solubility of additives, e.g. polyaddition catalysts, polycarboxylic acid, etc. Solvents having a low flash point are preferred. Solvents suitable for this purpose are triethyl phosphate, dibutyl glycol acetate, biodiesel (Sovermol 1058), high-boiling petroleum fractions (e.g. Total EDC Aliphatic Base-Oil, Shellsol aromatic hydrocarbons), ionic liquids (Basionics) or classical plasticizers such as phthalates (e.g. Palatinol N).

The liquid isocyanate component and/or the liquid isocyanate-reactive component, in particular the liquid isocyanate-reactive component, optionally comprises a dispersant in order to achieve satisfactory dispersion of additives, e.g. polyaddition catalysts, polycarboxylic acid, etc. The following groups of dispersants display a particularly good effect in the compositions according to the invention:

(a) phosphoric ester salts of amino group-comprising oligomers or polymers, for example phosphoric ester salts of optionally fatty acid-modified or alkoxylated (in particular ethoxylated) polyamines, phosphoric ester salts of epoxide-polyamine adducts, phosphoric ester salts of amino group-comprising acrylate or methacrylate copolymers and phosphoric ester salts of acrylate-polyamine adducts, (b) monoesters or diesters of phosphoric acid, for example monoesters or diesters of phosphoric acid with alkyl, aryl, aralkyl or alkylaryl alkoxylates (e.g. phosphoric monoesters or diesters of nonylphenol ethoxylates, isotridecyl alcohol ethoxylates, butanol-initiated alkylene oxide polyethers), monoesters or diesters of phosphoric acid with polyesters (e.g. lactone polyesters such as caprolactone polyesters or mixed caprolactone/valerolactone polyesters), (c) acidic monoesters of dicarboxylic acids, for example acidic dicarboxylic acid monoesters (in particular of succinic acid, maleic acid or phthalic acid) with alkyl, aryl, aralkyl or alkylaryl alkoxylates (e.g. nonylphenol ethoxylates, isotridecyl alcohol ethoxylates or butanol-initiated alkylene oxide polyethers), (d) polyurethane-polyamine adducts, (e) polyalkoxylated monoamines or diamines (e.g. ethoxylated oleylamine or alkoxylated ethylene diamine), (f) reaction products of unsaturated fatty acids with monoamines, diamines and polyamines, amino alcohols and unsaturated 1,2-dicarboxylic acids and anhydrides thereof and salts thereof and reaction products of alcohols and/or amines.

Suitable dispersants are available as commercial products under the tradename Disperbyk, e.g. Disperbyk 190.

The liquid isocyanate component and/or the liquid isocyanate-reactive component, in particular the liquid isocyanate-reactive component, optionally comprise a rheology modifier, in particular a polymeric rheology modifier, in order to set a suitable initial viscosity and/or rheological behavior. Suitable polyacrylic acids or salts thereof are obtainable under the tradename Sokalan® from BASF SE. Suitable cationic polymers are obtained under the tradename Luviquat.

The liquid isocyanate-reactive component and/or the solid isocyanate-reactive component can optionally comprise a silicate source. Silica, water glass or water glass in powder form, e.g. having an $SiO_2$/alkali oxide mass ratio in the range from about 2:0.8 to 2:1.2, are suitable for this purpose.

In particular embodiments, the liquid isocyanate component, the liquid isocyanate-reactive component and/or the solid isocyanate-reactive component comprises a flame retardant. Suitable flame retardants are, for example, tricresyl phosphate, tris(2-chloroethyl) phosphate, tris(2-chloropropyl) phosphate, tris(1,3-dichloropropyl) phosphate, tris (2,3-dibromopropyl) phosphate and tetrakis(2-chloroethyl) ethylenediphosphate, triphenyl phosphate, triethyl phosphate, tetrabromobisphenol A, decabromodipentyl ether. Apart from the halogen-substituted phosphates mentioned above, it is also possible to use inorganic flame retardants such as red phosphorus, aluminum oxide hydrate, antimony oxide, antimony trioxide, arsenic oxide, zinc borate, ammonium polyphosphate, expandable graphite and calcium sulfate or cyanuric acid derivatives, e.g. melamine, or fillers such as ground limestone. In addition, unexpanded and also previously expanded layer materials, e.g. raw vermiculite or expanded vermiculite, can be used as flame retardants. Mixtures of at least two flame retardants, e.g. ammonium polyphosphates and melamine and/or expandable graphite, can also be used.

The flame retardants preferably comprise expandable graphite and oligomeric organophosphorus flame retardant. Expandable graphite is generally known.

Particular preference is given to inorganic flame retardants such as ammonium phosphate, red phosphorus, expandable graphite, clay minerals (vermiculites, bentonites, talc), aluminum hydroxide, magnesium hydroxide or calcium hydroxide.

The invention also provides a process for filling cavities in mining, tunnel construction, civil engineering or in oil and gas recovery using a polyamide foam which does not propagate fire, wherein the above-defined liquid isocyanate component, liquid isocyanate-reactive component and optionally solid isocyanate-reactive component are mixed and the mixture is introduced in the cavity. If used, the solid isocyanate-reactive component can advantageously be dispersed in the liquid isocyanate-reactive component before the latter is mixed with the liquid isocyanate component. The mixing is usefully carried out in a mixing head into which the components are pumped separately and are mixed in the mixing head using a mixing element located in the mixing head. If existing natural rock formations are not sufficient as delimitation to prevent running-out and/or seepage, formwork can be provided. Since the reaction occurs virtually immediately, the mixture exiting from an application device foams rapidly and solidifies very quickly so that the construction of impervious formwork, which is generally expensive, can be avoided, as can the loss of material by flowing-out in the case of filling of large hollow spaces. Finally, the process of the invention can be employed with the assistance of simple formwork, i.e. formwork that is not absolutely impervious and is produced by means of coarse, loosely joined boards, optionally covered with a textile or a film, since seepage of the expanding foam through the nonabutting parts is limited to a very small extent due to the very rapid expansion.

The polyamide foams obtainable according to the invention can also be used as flame retardant foam in the construction of buildings (e.g. for openings through masonry, fire barriers). Since these foams display low inflammability and combustibility, high-temperature stability and non-fire-propagating properties compared to standard foams such as polystyrene or polyurethane, use for thermal insulation of industrial pipes and/or installations or heated pipes and/or (oil) pipelines or heating components can be advantageous due to the improved materials embrittlement and deformation. A further possible field of use is acoustic damping, which can be applied on building sites or be prefabricated. Less foamed versions of this material can then also be used as injection medium for filling cracks in mining or civil engineering or in the oil field sector for drilling or repair of wells.

The invention is illustrated by the following examples and figures.

FIG. 1 shows the temperature-time curve of the punking test in accordance with BS 5946:1980 for the foam as per example 9.

Figure 2:
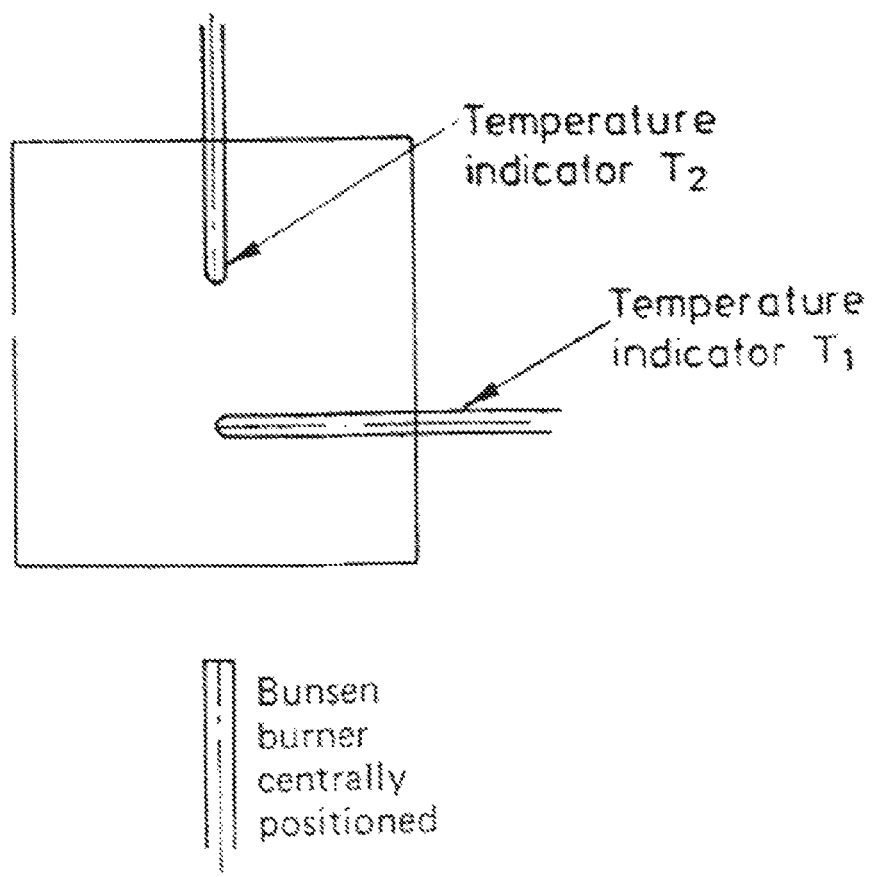

FIG. 2 schematically shows the positioning of the Bunsen burner and the temperature sensors in the punking test.

The following commercial chemicals were used for the following examples:

Lupranat M10R (BASF) Polymeric methlyenedi(phenyl isocyanate) (NCO content 31.7%, nominal NCO functionality 2.2)
Lupranat M20R (BASF) Polymeric methylenedi(phenyl isocyanate) (NCO content 31.4%, nominal NCO functionality 2.7)
Lupranat M200R (BASF) Polymeric methylenedi(phenyl isocyanate) (NCO content 31%, nominal NCO functionality 3)
Jeffcat ZR 50 (Huntsman) N,N-Bis(3-dimethylaminopropyl)-N-isopropanolamine
Jeffcat ZR 70 (Huntsman) 2-(2-Dimethylaminoethoxy)ethanol
Lupragen N106 (BASF) 4,4-(Oxydi-2,1-ethanediyl)bismorpholine
Lupragen N201 (BASF) Diazabicyclooctane
Lupragen N600 (BASF) 1,3,5-Tris(dimethylaminopropyl)-sym-hexahydrotriazine
Lupragen TCPP (BASF) Trichloropropyl phosphate
Empol 1062 (BASF) Fatty acid dimer based on tall oil (distilled, partially hydrogenated)
Empol 1043 (BASF) Fatty acid trimer based on tall oil
Pripol 1017 (Croda) Fatty acid dimer (acid number 190-197 mg KOH/g)
Pripol 1040 (Croda) Fatty acid trimer (acid number 184-194 mg KOH/g)
Tegostab B 8407 (Evonik) Polyoxyalkylene-polysiloxane The liquid components 1 and 2 described below and optionally the solid component 2.1 are mixed at ambient temperature using a mechanical stirrer or wooden spatula. The mixtures foam spontaneously and after curing form a solid polyamide foam.

EXAMPLE 1

Component 1: 6 g of Lupranat M20R.
Component 2: 5 g of Empol 1062 and 0.5 g of Jeffcat ZR 70.
Component 2.1: 1.2 g of isophthalic acid.

EXAMPLE 2

Component 1: 6 g of Lupranat M20R.
Component 2: 5 g of Empol 1062 and 0.5 g of Jeffcat ZR 70 and 1.2 g of isophthalic acid (predissolved in 4 g of triethyl phosphate).

EXAMPLE 3

Component 1: 6 g of Lupranat M20R.
Component 2: 5 g of Empol 1062 and 0.5 g of Jeffcat ZR 70 and 0.2 g of Tegostab B 8407 and 1.2 g of isophthalic acid (dispersed therein).

EXAMPLE 4

Component 1: 6 g of Lupranat M20R.
Component 2: 4.5 g of Empol 1043 and 0.5 g of Jeffcat ZR 70.
Component 2.1: 1.2 g of terephthalic acid.

EXAMPLE 5

Component 1: 6 g of Lupranat M10R.
Component 2: 4.5 g of Empol 1043 and 0.5 g of Jeffcat ZR 70 and 0.2 g of Tegostab B 8407.
Component 2.1: 1.2 g of isophthalic acid

EXAMPLE 6

A foam piece having a density of 70 kg/m$^3$ was produced as per example 5. A prism resulting from this foam piece was subjected to mechanical compressive testing.

An average compressive strength of 0.2 N/mm$^2$ at a compression of 10% was obtained.

EXAMPLE 7

A foam piece having a density of 75 kg/m$^3$ was produced as per example 5. A plate having the dimensions 20×20×4 cm resulting from this foam piece was examined to determine its thermal conductivity. This had a thermal conductivity of 51 mW/(m*K).

EXAMPLE 8

A foam piece produced as per example 5 was examined by thermogravimetry. The decomposition of the foam commenced at a temperature of 420° C.

EXAMPLE 9

Based on example 5, a batch having four times the amount of catalyst (relative to the total amount of the other components) and an increased batch size was used for producing 200 g of curable mixture in order to examine the heat of reaction. The components which had been preheated to 30° C. were mixed and the reaction temperature was measured during foaming. The maximum reaction temperature was 50° C.

A 12×12×12 cm cube having a density of 45 kg/m$^3$ obtained from the resulting foam block was subjected to a punking test in accordance with BS 5946:1980 to examine the fire propagation behavior. Here, 2 temperature sensors were introduced into the foam piece and a nonluminous Bunsen burner flame was subsequently applied to the foam for 50 minutes (see FIG. 2). After the end of the flame application time, the temperature at the temperature sensor T2 was measured until it had dropped to <40° C.; the temperature curve is shown in FIG. 1. In the experiment, the recorded temperatures decreased immediately after the flame was taken away. Burning thus neither continued nor spread. The cut-open foam cube was undamaged in the upper third after the test. In the damaged region of the test specimen, the foam remained in the form of a carbonized substance having a residual strength. Since burning did not continue and no complete carbonization of the material occurred during the test, the foam body passed the test.

EXAMPLE 10 (COMPARATIVE EXAMPLE)

Component 1: 6 g of Lupranat M10R.

Component 2: 4 g of Pripol 1017, 2 g of Pripol 1040 and 0.6 g of water and 1 g of 4,4-(oxydi-2,1-ethanediyl)bismorpholine (Lupragen N106) and 0.5 g of Tegostab B 8407.

14 seconds after mixing of the first component with the second component, the mixture begins to foam. Foaming ends after 2 minutes with a 14-fold increase in volume. A tack-free, solid foam which in contrast to the foams from examples 1-5 has a very fine foam structure is formed.

EXAMPLE 11

Component 1: 6 g of Lupranat M10R.

Component 2: 4 g of Pripol 1017, 2 g of Pripol 1040 and 0.6 g of water and 1 g of 4,4-(oxydi-2,1-ethanediyl)bismorpholine (Lupragen N106) and 0.5 g of Tegostab B 8407.

Component 2.1: 1.2 g of isophthalic acid.

In contrast to the foams of examples 1-5, this foam has a very fine foam structure.

EXAMPLE 12

Component 1: 6 g of Lupranat M20R.

Component 2: 2 g of Pripol 1017, 4 g of Pripol 1040, 0.6 g of water, 0.15 g of 4,4-(oxydi-2,1-ethanediyl)bismorpholine (Lupragen N106), 1.0 g of Jeffcat ZR50, 0.5 g of Tegostab B 8407 and 3 g of isophthalic acid (homogeneously dispersed therein).

The resulting foam has a finer foam structure than examples 1-5. A foam piece produced according to this formulation was subjected to a punking test in accordance with BS 5946:1980 in a manner analogous to example 9. The foam body passed the test. Compared to the foams of examples 10 and 11, this foam displays a better burning behavior, i.e. it is less readily flammable, self-extinguishing, carbonizes and melts to a lesser extent.

EXAMPLE 13

Component 1: 6 g of Lupranat M20R.

Component 2: 2 g of Pripol 1017, 4 g of Pripol 1040, 0.6 g of water, 0.15 g of 4,4-(oxydi-2,1-ethanediyl)bismorpholine (Lupragen N106), 1.0 g of Jeffcat ZR50, 0.5 g of Tegostab B 8407, 2 g of isophthalic acid and 1 g of trimellitic acid (homogeneously dispersed therein).

The resulting foam has a finer foam structure than examples 1-5, but a better burning behavior than examples 10 and 11 (less readily flammable, self-extinguishing, carbonizes and melts to a lesser extent).

EXAMPLE 14

Polyamide foams were produced as follows from the components and amounts (in g) summarized in the following table: all components with the exception of Lupranat M200R were mixed; the Lupranat M200R was then mixed in. The mixtures foamed and after curing formed a solid polyamide foam. A 12×12×12 cm$^3$ cube was cut from the foam pieces after 24 hours. The burning behavior of the cubes was examined in the punking test described in example 9. The temperatures T1 (bottom) and T2 (middle) attained after 10 and 20 minutes are likewise reported in the table.

| | A | B | C-1 | C-2 | C-3 |
|---|---|---|---|---|---|
| Lupranat M200R | 72.0 | 72.0 | 63.5 | 55.8 | 51.3 |
| Isophthalic acid | 40.0 | | 31.3 | 24.4 | 17.6 |
| Adipic acid | | 35.0 | | | |
| Pripol 1040 | 102.0 | 102.0 | 120.0 | 133.4 | 146.3 |
| Water | 0.6 | 0.6 | 0.6 | 0.6 | 0.6 |
| Lupragen N201 | 8.0 | 8.0 | 8.0 | 8.0 | 8.0 |
| Lupragen N600 | 4.0 | 4.0 | 4.0 | 4.0 | 4.0 |
| Lupragen TCPP | 25.0 | 25.0 | 25.0 | 25.0 | 25.0 |
| Triethyl phosphate | 15.0 | 15.0 | 15.0 | 15.0 | 15.0 |
| T1(after 10/20* min) | 364* | 359* | 140 | 158 | 239 |
| T2(after 10/20* min) | 75* | 172* | 46 | 120 | 90 |

Comparison of experiments A and B shows that after 20 minutes and at a comparable temperature T1, the temperature T2 is increased only moderately in experiment A, while T2 is increased significantly more greatly in experiment B. This demonstrates that foam A has a lower fire-propagating behavior.

The series C-1, C-2 and C-3 shows that with decreasing ratio of isophthalic acid/Pripol 1040, the combustibility of the foam increases, which can be seen from the greater increase in the temperature T1 after 10 minutes.

The invention claimed is:

1. A process for producing polyamide foams which do not propagate fire by mixing
    (i) a liquid isocyanate component which comprises at least one polyisocyanate and in which the molar ratio of aromatic isocyanate groups to the sum of aromatic and aliphatic isocyanate groups is at least 60 mol %
    with
    (ii) at least one liquid isocyanate-reactive component which comprises a reactive diluent, where the reactive diluent comprises
        (a) a chain-extending and/or crosslinking reactive diluent selected from the group consisting of aliphatic branched $C_{24-66}$-polycarboxylic acids, alicyclic $C_{24-66}$-polycarboxylic acids, partial esters of polycarboxylic acids having at least two unesterified carboxyl groups, and mixtures thereof and/or
        (b) a chain-terminating reactive diluent selected from the group consisting of aliphatic branched $C_{24-66}$-monocarboxylic acids, alicyclic $C_{24-66}$-monocarboxylic acids, partial esters of polycarboxylic acids having one unesterified carboxyl group, and mixtures thereof, and (iii) optionally a solid isocyanate-reactive component, where the liquid isocyanate-reactive component and/or the solid isocyanate-reactive component comprises an aromatic $C_{8-18}$-polycarboxylic acid and/or an anhydride thereof;

wherein the molar ratio of aromatic carboxyl groups to the sum of aromatic and aliphatic carboxyl groups in (ii) and (iii) is at least 10 mol %.

2. The process according to claim 1, wherein the liquid isocyanate component comprises diphenylmethane diisocyanate, a mixture of monomeric diphenylmethane diisocyanate and homologs of diphenylmethane diisocyanate having more than two rings or prepolymers of diphenylmethane diisocyanate or mixtures thereof.

3. The process according to claim 1, wherein the aliphatic, branched $C_{24-66}$-polycarboxylic acid and/or alicyclic $C_{24-66}$-polycarboxylic acid is selected from the group consisting of dimeric fatty acids, trimeric fatty acids and mixtures thereof, which are optionally hydrogenated.

4. The process according to claim 1, wherein the liquid isocyanate component, the liquid isocyanate-reactive component and/or the solid isocyanate-reactive component comprises a polyaddition catalyst.

5. The process according to claim 4, wherein the polyaddition catalyst is selected from the group consisting of tin-organic compounds, tertiary amines, alkaline earth metal salts, and mixtures thereof.

6. The process according to claim 1, wherein the liquid isocyanate component and/or the liquid isocyanate-reactive component comprises a foam stabilizer.

7. The process according to claim 1, wherein the liquid isocyanate component, the liquid isocyanate-reactive component and/or the solid isocyanate-reactive component comprises a flame retardant.

8. A process for filling cavities in mining, tunnel construction, civil engineering or in oil and gas recovery using a polyamide foam which does not propagate fire, wherein the process comprises mixing the liquid isocyanate component, the liquid isocyanate-reactive component and optionally the solid isocyanate-reactive component as defined in claim 1 and introducing the mixture into the cavity.

9. The process according to claim 8 further comprising delimiting the cavity by means of formwork and introducing the mixture into the delimited cavity.

10. A polyamide foam obtained by the process according to claim 1.

* * * * *